United States Patent Office 3,032,558
Patented May 1, 1962

3,032,558
TETRAHYDROPYRAN CARBOXYLIC ACIDS AND ESTERS, AND PROCESSES FOR THE PRODUCTION THEREOF
Amelio E. Montagna, South Charleston, and Julius J. Brezinski, St. Albans, W. Va., and Donald G. Kubler, Columbia, S.C., assignors to Union Carbide Corporation, a corporation of New York
No Drawing. Filed Dec. 24, 1958, Ser. No. 782,628
12 Claims. (Cl. 260—345.7)

The present invention relates to processes for producing heterocyclic carboxylic acids and carboxylic acid esters, and is especially concerned with processes for the production of both carboxylic acid derivatives and alkyl carboxylic acid ester derivatives of tetrahydropyrans, including alkyl-substituted tetrahydropyrans, certain of which are believed to constitute new compositions of matter. The application is a continuation-in-part of copending application Serial No. 774,821, filed November 19, 1958, now issued as United States Patent No. 2,939,880.

More particularly, the tetrahydropyran derivatives produced in accordance with the processes of the invention can be represented by the general formula:

(I)

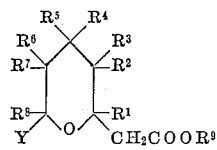

wherein each $R^1$ to $R^8$ respectively designates a member of the class consisting of hydrogen and the lower alkyl radicals containing from 1 to about 4 carbon atoms, $R^9$ designates a member of the class consisting of hydrogen and the alkyl radicals containing from 1 to about 18 carbon atoms, and Y designates a member of the class consisting of hydrogen, the lower alkyl radicals containing from 1 to about 4 carbon atoms, the carbalkoxy radicals containing from 2 to about 19 carbon atoms and the carboxy radical; and wherein when Y designates a carbalkoxy radical, $R^9$ designates an alkyl radical and when Y designates the carboxy radical, $R^9$ designates hydrogen. By way of illustration, each $R^1$ to $R^8$ respectively can be hydrogen or a methyl, ethyl, propyl, isopropyl, butyl or isobutyl radical, and the like; $R^9$ can be hydrogen or a methyl, ethyl, isopropyl, butyl, hexyl, 2-ethylhexyl, decyl, tetradecyl or octadecyl radical, and the like; and Y can be hydrogen or a methyl, ethyl, propyl, isopropyl, butyl, isobutyl, carbomethoxy, carbethoxy, carbobutoxy, carbohexoxy, carbo-2-ethylhexoxy, carbodecyloxy, carbotetradecyloxy, carboctadecyloxy or carboxy radical, and the like. Thus, when Y designates hydrogen or an alkyl radical, the products of the invention are derivatives of, and include, tetrahydropyran-2-acetic acid; and when Y designates a carbalkoxy radical and $R^9$ designates an alkyl radical, or when Y designates a carboxy radical and $R^9$ designates hydrogen, the products of this invention are derivatives of, and include, 6-carboxytetrahydropyran-2-acetic acid. In particular, it is the difunctional acids and esters represented above by Formula I, wherein Y designates a carbalkoxy or carboxylic acid radical, that are believed to constitute new compositions of matter.

In the broadest aspect, the processes of the invention contemplate the production of the tetrahydropyran derivatives described herein from starting materials comprising polymeric ester compositions formed substantially of recurring units represented by the general formula:

(II)

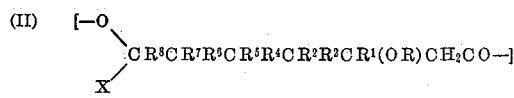

wherein R designates an alkyl radical containing from 1 to about 18 carbon atoms, $R^1$ to $R^8$ are as defined above and X designates a member of the class consisting of hydrogen, the lower alkyl radicals containing from 1 to about 4 carbon atoms and the carbalkoxy radicals containing from 2 to about 9 carbon atoms. As provided by the invention, these polymeric ester compositions are subjected, within the operating conditions set forth below, to either saponification and acidification, or to transesterification, depending upon whether a carboxylic acid derivative or carboxylic acid ester derivative of tetrahydropyran is desired as a product. In addition, the tetrahydropyran carboxylic acid esters of the invention can also be prepared from the corresponding tetrahydropyran carboxylic acids by direct esterification.

The polymer ester compositions found suitable for use as starting materials in the processes of the invention are obtained in accordance with the processes described in copending application serial No. 517,074, filed June 21, 1955, now issued as United States Patent No. 2,876,239. More specifically, the polymeric ester compositions are produced by reacting ketene with a 2-alkoxytetrahydropyran or substituted 2-alkoxytetrahydropyran represented by the general formula:

(III)

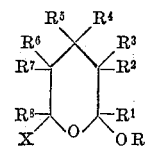

wherein R, $R^1$ to $R^8$ and X are as defined above, at a reaction temperature within the range of from −80° C. to 100° C. and in the presence of an acidic catalyst. The polymeric ester compositions are recovered as thick liquid products having viscosities of about 1,000 centistokes or higher at a temperature of 100° C. and molecular weights of from about 325 to about 3,000 and higher, and can subsequently be employed as herein described for the production of the tetrahydropyran carboxylic acids and tetrahydropyran carboxylic acid esters of the invention.

Illustrative of the broad range of polymeric ester compositions found useful as starting materials in the processes of the invention there can be mentioned the following although others can also be employed.

Polymeric esters of:
    3-ethoxy-7-hydroxyheptanoic acid,
    3-methoxy-7-hydroxyheptanoic acid,
    3-[2-ethylhexoxy]-7-hydroxyheptanoic acid,
    3-ethoxy-4-ethyl-5-methyl-7-hydroxyheptanoic acid,
    3-ethoxy-5-methyl-7-hydroxyheptanoic acid,
    3-ethoxy-6-butyl-7-hydroxyheptanoic acid,
    3-butoxy-3-methyl-7-hydroxyheptanoic acid,
    3-butoxy-5-propyl-7-hydroxyheptanoic acid,
    3-[2-ethylhexoxy]-5-isopropyl-7-hydroxyheptanoic acid,
    3-ethoxy-4,6-diethyl-5-propyl-7-hydroxyheptanoic acid,
    3-ethoxy-7-methyl-7-hydroxyheptanoic acid,
    3-ethoxy-7-carbethoxy-7-hydroxyheptanoic acid,
    3-butoxy-7-carbobutoxy-7-hydroxyheptanoic acid,
    3-butoxy-4,7-dimethyl-7-carbobutoxy-7-hydroxyheptanoic acid,
    3-[2-ethylhexoxy]-4,7-dimethyl-7[carbo-2-ethylhexoxy]-7-hydroxyheptanoic acid,
    and the like.

In an embodiment of the invention, when a carboxylic acid derivative of tetrahydropyran is desired as a product, the polymeric ester composition is suitably admixed with an alkaline saponification agent, generally in the presence of an amount of water sufficient to dissolve the saponification agent. The reaction mixture is then heated at a temperature of at least about 125° C. In this manner, the polymeric ester composition undergoes saponification, dealcoholation and cyclization and is converted to a monomeric alkaline salt of a tetrahydropyran carboxylic acid. It is to be noted that the dealcoholation and cyclization step is based upon the interaction of the beta carbon atom and the oxygen atom attached to the zeta carbon atom of each recurring unit of the polymeric ester composition. Thus, the alkyl alcohol represented by the general formula ROH, wherein R is as defined above, is formed simultaneously with the formation of the heterocyclic tetrahydropyran structure. The removal of such alcohol from the reaction mixture during the course of reaction is preferred since the dealcoholation and cyclization step is thereby hastened and a higher yield of the desired product realized. In addition, an initial evolution of alcohol, not to be confused with the alcohol formed during cyclization, can also be observed upon saponification of polymeric ester compositions represented above by Formula II, wherein X designates a carbalkoxy radical. For similar reasons to those described above with respect to the achievement of improved reaction rates and product yields, the removal of such alcohol from the reaction mixture during the course of reaction is also preferred. Recovery of a tetrahydropyran carboxylic acid product can thereafter be accomplished through the acidification of the alkaline reaction mixture, followed by the separation of the acid from the acidified mixture in any convenient manner.

Of the alkaline saponification agents, an aqueous alkali metal hydroxide solution, such as an aqueous solution of sodium hydroxide, potassium hydroxide or lithium hydroxide, engenders particularly efficient results in accordance with the invention, although other alkaline saponification agents, such as the alkali metal carbonates, etc., can also be utilized. Moreover, as the saponification is generally carried out in an aqueous medium, the use of a water-soluble alkaline saponification agent is preferred.

The saponification ordinarily employs about one equivalent of the saponification agent for each ester linkage present in the polymeric ester composition undergoing reaction. For example, the saponification of polymeric ester compositions represented above by Formula II, wherein X designates a substituent other than a carbalkoxy radical, involves the use of about one equivalent of the saponification agent for each recurring unit of the polymeric ester composition; and when X designates a carbalkoxy radical, about 2 equivalents of the saponification agent for each recurring unit of the polymeric composition are employed. It has been observed that each ester linkage present in the polymeric ester composition is capable of undergoing saponification and can subsequently be acidified to a carboxylic acid function. Thus, when X designates a carbalkoxy radical, a dicarboxylic acid derivative of tetrahydropyran as represented above by Formula I, wherein $R^9$ designates hydrogen and Y designates a carboxy radical, is ultimately produced. In addition, it has been found preferable during the saponification to have a slight excess of the saponification agent present, e.g., about a 5 percent excess by weight, in order to insure a more complete saponification. Little commensurate advantage, however, can be expected by the use of a further excess of the saponification agent, while the use of lesser quantities than those indicated above ordinarily results in the realization of diminished product yields or yields containing incompletely saponified products.

The temperature at which the reaction is carried out is of prime importance to the production of the tetrahydropyran carboxylic acids of the invention. While the saponification of the polymeric ester composition to produce a monomeric alkaline carboxylic acid salt in itself will take place at temperatures as low as about 30° C., a reaction temperature of at least about 125° C. has been found essential to the dealcoholation and cyclization step required for the formation of the tetrahydropyran structure. Preferably, the reaction mixture is heated at a temperature within the range of from about 130° C. to about 150° C. Such elevated reaction temperatures can be attained conveniently, for example, by initially heating the reaction mixture at a temperature of up to about 120° C. so as to effect the saponification of the polymeric ester composition, and thereafter concentrating and heating the reaction mixture to a point at which the dealcoholation that accompanies cyclization is observed. It is to be noted that, because of the viscous character of the concentrated reaction mixture, the use of adequate agitation becomes especially important in order to achieve sufficient heat transfer and prevent the occurrence of localized areas of excessively high temperatures. If desired, an inert solvent for the polymeric ester composition, such as diethylene glycol dimethyl ether, other lower alkyl diethers of ethylene glycol and diethylene glycol, and the like, can also be utilized to assist in controlling the reaction temperature, although the use of such a solvent is not essential to the invention. The reaction can also be carried out satisfactorily at temperatures above the preferred range previously indicated, up to a temperature of about 175° C., or slightly higher. However, as the reaction temperature increases above about 170° C., undesirable side-reactions may occur, thereby diminishing the yield of the desired product and rendering the subsequent recovery of the product more inconvenient.

Within the operative temperature range, the reaction is ordinarily performed at atmospheric pressure, although higher or lower pressures can also be used. Moreover, while the removal from the reaction mixture of alcohol formed during the course of reaction is preferred, the utilization of such a process step is not critical to the invention. Thus, when the use of superatmospheric pressure is desired in order to attain a sufficiently high reaction temperature, or for any other reason, good results can be realized by carrying out the reaction in a closed system. The alcohol formed during the reaction thereby remains in solution and, advantageously, may serve as a solvent for the polymeric ester composition.

Upon completion of the reaction, any alcohol contained in the reaction mixture is generally removed by distillation, or other suitable means. The remaining alkaline tetrahydropyran carboxylic acid salt is then acidified, preferably by reaction with a mineral acid, such as sulfuric, hydrochloric or phosphoric acid, thus converting the tetrahydropyran carboxylic acid salt to the corresponding carboxylic acid.

The acid employed in the acidification is preferably introduced to the reaction mixture in aqueous solution, and is admixed therewith in an amount of acid approximately equivalent to the amount of saponification agent previously utilized for the saponification. A slight excess of the acid, e.g., about a 5 percent excess by weight, is generally employed in order to insure the complete neutralization of the saponification agent. The introduction of acid can be effected at any temperature of between about 0° C. and 100° C., with particularly efficient results being obtained by maintaining the temperature of the reaction mixture in the range of between 15° C. and 50° C. during the acidification. The desired tetrahydropyran carboxylic acid product can thereafter be separated from the acidified mixture, as for instance, by extraction with a suitable organic solvent, such as diethyl ether, and recovered from the extract by distillation. Other convenient means of separation can also be employed. For example, when the carboxylic acid product is an insoluble solid, the product can be recovered from the acidified mixture by filtration.

When a carboxylic acid ester derivative of tetrahydropyran is instead desired, the corresponding tetrahydropyran carboxylic acid, obtained as described above, can be subjected to direct esterification. The direct esterification can be carried out, for example, by admixing the carboxylic acid with an alkyl alcohol and heating the reaction mixture at a temperature up to about 120° C. or higher, preferably in the presence of a catalytic amount of an acidic direct esterification catalyst, while removing the water of esterification formed during the course of reaction. It is also frequently desirable to incorporate in the reaction mixture an entrainer such as benzene, diisopropyl ether, and the like, to assist in the removal of the water of esterification. Atmospheric pressure is generally employed for the reaction, although higher or lower pressures can also be utilized.

The alkyl alcohols found suitable for use as a reactant in the direct esterification are those represented by the general formula $R^9OH$, wherein $R^9$ designates an alkyl radical containing from 1 to about 18 carbon atoms and particularly from 1 to about 8 carbon atoms. Typical of such alcohols there can be mentioned methanol, ethanol, 2-propanol, isobutanol, 2-ethylhexanol, decanol, tetradecanol, octadecanol, and the like, although other alkyl alcohols can also be employed.

The alcohol reactant is ordinarily admixed with the tetrahydropyran carboxylic acid in an amount at least equal to the stoichiometric amount required for the direct esterification. Thus, with a tetrahydropyran monocarboxylic acid, at least one mol of alcohol per mol of acid is preferably employed, while a tetrahydropyran dicarboxylic acid is preferably reacted with at least 2 mols of alcohol per mol of acid. In particular, it has been found desirable to incorporate the alcohol in the reaction mixture in about a 5 to about a 10 mol excess of the stoichiometric amount required for reaction, the excess alcohol serving as a solvent for the carboxylic acid reactant. Less than stoichiometric quantities of alcohol can also be utilized in the direct esterification, accompanied, however, by the formation of decreased product yields.

When the use of a direct esterification catalyst is desired, a mineral acid catalyst such as sulfuric acid is preferably employed, although any other acidic direct esterification catalyst can also be utilized. Especially good results can be obtained in this respect when the catalyst is present in the reaction mixture in a concentration of from about 0.1 to about 0.5 percent based upon the weight of the reactants, with catalyst concentrations of from about 0.05 to about 1.0 percent and higher based upon the weight of the reactants also permitting satisfactory conversions to the desired carboxylic acid ester product.

Upon completion of the direct esterification, the acidic catalyst is neutralized by the addition of an alkaline compound such as sodium ethoxide, the hydroxide or carbonate of either sodium or potassium, or the like. The tetrahydropyran carboxylic acid ester product can thereafter be recovered from the reaction mixture by distillation or in any other suitable manner.

Advantageously, a more direct and convenient process for the production of the tetrahydropyran carboxylic acid esters of this invention has now been found to lie in the transesterification of the polymeric ester compositions represented above by Formula II, under the operating conditions described below. The transesterification is carried out by suitably admixing the polymeric ester composition with an alkyl alcohol and heating the reaction mixture at a temeprature of at least about 120° C., in the presence of catalytic amounts of a basic transesterification catalyst. In this manner, the polymeric ester composition undergoes dealcoholation and cyclization and is converted to a monomeric tetrahydropyran carboxylic acid ester. As similarly described hereinabove, the dealcoholation and cyclization step is based upon the interaction of the beta carbon atom and the oxygen atom attached to the zeta carbon atom of each recurring unit of the polymeric ester composition. Thus, the alkyl alcohol represented by the general formula ROH, wherein R is as defined above, is formed simultaneously with the formation of the heterocyclic tetrahydropyran structure. The removal of such alcohol from the reaction mixture during the course of reaction is preferred since the dealcoholation and cyclization step is thereby hastened, the possibility of forming mixed tetrahydropyran carboxylic acid ester product when more than one type of alcohol is present is reduced and a higher yield of the desired product is realized. Moreover, the removal of such alcohol as described herein has been found essential to the substantial production of the tetrahydropyran carboxylic acid esters of the invention when the reaction is carried out at low operating temperatures of up to about 150° C. Under such operating conditions, an alkyl alcohol other than one identical to the alcohol formed during cyclization is necessarily selected as a reactant so that the removal of the latter alcohol during the course of reaction can be effected unaccompanied by the removal of the alcohol reactant. In addition, an initial evolution of alcohol, not to be confused with the alcohol formed during cyclization, may also be observed upon transesterifiaction of polymeric ester compositions represented above by Formula II, wherein X designates a carbalkoxy radical also capable of undergoing transesterification. For similar reasons to those described above with respect to the achievement of improved reaction rates and product yields, as well as the inhibition of mixed ester formation, the removal of such alcohol from the reaction mixture during the course of reaction is also preferred, although not critical to the invention. Anhydrous conditions are generally maintained during the reaction. Recovery of the tetrahydropyran carboxylic acid ester product can thereafter be accomplished by the neutralization of the basic catalyst followed by the distillation of the reaction mixture or by separation therefrom in any other convenient manner. If desired, the neutralization step can be omitted, provided that a temperature of above about 120° C. is not reached during the distillation.

The alkyl alcohols found suitable for use as a reactant in the transesterification include any of those described above in connection with the direct esterification process. In addition, the alcohol reactant is preferably one having a boiling point above the boiling point of the alcohol formed during cyclization. In this manner, the removal of the lower boiling alcohol formed during the course of reaction can be effected conveniently by a suitable adjustment of the reaction temperature. Any other means for removing the alcohol formed during cyclization, as preferred, can also be utilized in the invention, whether such alcohol be higher boiling or lower boiling than the alcohol employed as a reactant. In the particular instance when the alcohol reactant is identical to the alcohol formed during cyclization, removal of the latter alcohol during the course of reaction undesirably entails the simultaneous removal of the alcohol reactant. Thus, under such a circumstance, the reaction is necessarily carried out, unaccompanied by the removal of the alcohol, at a temperature above 150° C., if a substantial yield of the desired product is to be realized.

The alcohol reactant is ordinarily admixed with the polymeric ester composition in an amount at least equal to the stoichiometric amount required for reaction. For example, the transesterification of polymeric ester compositions represented above by Formula II, wherein X designates a substituent other than a carbalkoxy radical, involves the use of at least one mol of alcohol for each recurring unit of the polymeric ester composition; and wherein X designates a carbalkoxy radical also capable of undergoing transesterification, at least two mols of alcohol for each recurring unit of the polymeric ester composition are employed. In the latter instance, the alcohol employed as a reactant is also preferably one having a boiling point above that of the alcohol formed by the transesterification of the carbalkoxy radical, in order to facilitate the removal of the lower boiling alcohol during the course of reaction. In addition, it has been found desirable to incorporate the alcohol in the reaction mixture in a substantial excess of the stoichiometric amount required for reaction. The excess alcohol reactant serves both as an initial solvent for the polymeric ester composition undergoing reaction and to reduce further the possibility of forming mixed tetrahydropyran carboxylic acid ester products. Less than stoichiometric amounts of alcohol can also be utilized, resulting, however, in the recovery of diminished product yields or incompletely transesterified products.

While any basic transesterification catalyst can be employed in accordance with this invention, particularly efficient results can be achieved using the alkoxides of either alkali metals or alkaline earth metals such as the alkoxides of sodium, lithium, potassium or calcium, etc., as the catalyst. Moreover, for similar reasons to those described above with respect to the inhibition of mixed ester formation the catalyst is preferably selected from among those in which the alkoxy group is derived from an alkyl alcohol having a boiling point below that of the alcohol utilized as a reactant. It is to be noted in this respect that the transesterification catalyst can, if desired, be prepared in situ by the reaction of either an alkali metal or an alkaline earth metal with an alkyl alcohol.

The concentration of transesterification catalyst to be employed is not narrowly limited. Thus, for example, catalyst concentrations of from about 0.2 to about 2.0 percent and higher by weight of the polymeric ester composition can be used with concentrations of from about 0.5 to about 1.0 percent by weight of the polymeric ester composition being preferred. In addition, sufficient catalyst must be utilized to react first with any residual acid product in the polymeric ester composition.

The reaction temperature is critical to the invention. While the transesterification of the polymeric ester composition to produce a monomeric carboxylic acid ester in itself will take place at temperatures as low as about 70° C., a reaction temperature of at least 120° C. has been found essential to the dealcoholation and cyclization step required for the formation of the heterocyclic tetrahydropyran structure. Preferably, the reaction mixture is heated at a temperature within the range of from about 150° C. to 200° C. In addition, where possible, the reaction temperature is desirably adjusted so that it is below the boiling point of the alcohol reactant and above the boiling point of the alcohol formed during the reaction so as to facilitate the removal of the lower boiling alcohol during the course of reaction. The reaction can also be carried out satisfactorily at temperatures above the preferred range previously indicated up to a temperature of about 210° C. or slightly higher. However, as the reaction temperature increases above about 200° C., undesirable side reactions may occur, thereby diminishing the yield of the desired product and rendering the subsequent recovery of the product more inconvenient.

Within the operative temperature range, the reaction is ordinarily performed at atmospheric pressure, although higher or lower pressures can also be used. Moreover, while the removal from the reaction mixture of alcohol formed during cyclization is essential at reaction temperatures up to about 150° C., the utilization of such a process step at higher temperatures is not critical to the invention. Thus, when the use of superatmospheric pressure is desired in order to attain a sufficiently high reaction temperature, or for any other reason, good results can be realized by carrying out the reaction in a closed system. The alcohol formed during the reaction thereby remains in solution. Under such operating conditions, it is particularly desirable, when possible, to select as the alcohol reactant an alcohol identical to the alcohol formed during the reaction so as to preclude the possibility of producing mixed tetrahydropyran carboxylic acid ester products.

The basic catalyst employed in the transesterification is preferably neutralized upon completion of the reaction, prior to the removal of any alcohol present in the reaction mixture. The neutralization can be effected by the addition of a mineral acid, such as concentrated sulfuric acid or gaseous hydrogen chloride, to the reaction mixture or in any other convenient manner, as for instance, by the addition of gaseous carbon dioxide. Any salt precipitated upon neutralization can be removed by filtration. After transesterification, the reaction mixture is generally distilled to remove any alcohol present and the residual product subjected to further fractional distillation, preferably under reduced pressure, so as to recover the tetrahydropyran carboxylic acid product. Other suitable means of separation can also be employed.

The tetrahydropyran carboxylic acids and tetrahydropyran carboxylic acid esters produced in accordance with the processes of the invention find suitable utility as precursors for the production of various film-forming polymers as well as resinous plasticizers. For example, compounds of the type represented above by Formula I, wherein Y designates hydrogen or an alkyl radical, can be reacted with an excess over an equimolar quantity of an aliphatic diol such as 1,6-hexanediol in accordance with either conventional esterification or transesterification reactions, depending upon whether a carboxylic acid or carboxylic acid ester product is employed as a starting material, so as to form predominantly a dihydroxy monoester intermediate. This intermediate can then be esterified with a dibasic carboxylic acid such as adipic acid under conventional conditions to produce polymeric esters suitable for use as plasticizers for vinyl resins. The same carboxylic acid or carboxylic acid esters of this invention can also be reacted with an aliphatic aminoalcohol such as 4-aminobutanol under conventional conditions of elevated temperature required for the production of carboxylic acid amides, so as to form a dihydroxy monoamide intermediate. In turn, this intermediate can be esterified with a dibasic carboxylic acid such as adipic acid, thus obtaining polymeric ester amides suitable for use as plasticizers for vinyl resins. In a similar manner to that described above, the difunctional tetrahydropyran carboxylic acids and tetrahydropyran carboxylic acid esters of this invention represented above by Formula I, wherein Y designates a carboxy radical and $R^9$ designates hydrogen, or wherein Y designates a carbalkoxy radical and $R^9$ designates an alkyl radical, can be reacted with an aliphatic diol such as 1,6-hexanediol, or with an aliphatic diamine such as 1,6-hexanediamine, so as to form polymeric esters and polymeric ester amides which are suitable for use as surface coatings and as plasticizers for vinyl resins.

The processes of this invention can be illustrated further in connection with the following specific examples of its practice.

*Example 1*

To 651 grams (4.9 mols) of 2-ethoxytetrahydropyran, cooled to a temperature of −10° C., there were added 20.3 cc. of a 32 percent solution of boron trifluoride in diethyl ether. Eighty-seven grams (2.1 mols) of ketene were then bubbled into the solution at a rate of 17.4 grams per hour, while maintaining the reaction mixture at a temperature between −9° C. and +1° C. Upon the complete addition of ketene, the acidic catalyst was neutralized by the addition of aqueous sodium acetate and the crude reaction product diluted further with 1100 cc. of diisopropyl ether. The organic layer thereby formed was separated and extracted with water to remove the inorganic salts present. The amount of ketene absorbed during the reaction was found to be 71 grams (1.7 mols). The organic product was then stripped of water and diisopropyl ether, after which 231 grams (1.75 mols) of unreacted 2-ethoxytetrahydropyran was removed by distillation at a temperature of 185° C., under 2 mm. of mercury pressure. The residual product, a polymeric ester composition, was recovered in a 285-gram yield as a viscous, light-yellow oil and had the following properties: 174 (theory: 172); viscosity at a temperature of 100° C.: 1492 centistokes; average molecular weight: 1600; elemental analysis in percent by weight:

|   | Found | Calculated for $(C_9H_{16}O_3)X$ |
|---|---|---|
| C | 62.8 | 62.7 |
| H | 9.4 | 9.4 | indicating a recurring unit structure for the polymeric ester composition represented by the general formula:

wherein X has an average value of 9.3 as calculated from the determination of average molecular weight.

Example 2

A polymeric ester composition formed of recurring units represented by the general formula:

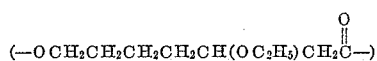

was prepared in a manner essentially as described above in Example 1, employing 219 grams (5.21 mols) of ketene and 1302 grams (10.0 mols) of 2-ethoxytetrahydropyran as reactants. Just prior to the removal of unreacted 2-ethoxytetrahydropyran, 240 grams (6.0 mols) of sodium hydroxide was introduced to the crude polymeric ester composition and the resulting mixture steam distilled, whereupon 759 grams (5.84 mols) of unreacted 2-ethoxytetrahydropyran were removed. The residual aqueous solution was concentrated by the distillation of water until the temperature of the concentrate reached 130° C., at which point the evolution of ethanol was observed. Heating was continued at a temperature within the range of from 130° C. to 150° C., accompanied by the continuous removal of ethanol from the reaction mixture until further quantities of alcohol could no longer be collected. The viscous reaction mixture was diluted with 750 cc. of water, cooled to a temperature of 25° C. and acidified by the addition of 157 cc. of concentrated sulfuric acid. The resulting solution was extracted with two 500 cc. portions of methyl isobutyl ketone and the extracts combined. The combined extracts were then stripped of solvent and distilled at a temperature of between 112° C. and 114° C., under a pressure of 2 mm. of mercury, whereupon 382 grams of tetrahydropyran-2-acetic acid were collected as a distillate. The distillate solidified upon cooling and was recovered as a white solid at room temperature having the following properties: melting point: 55° C. to 56.5° C.; neutralization equivalent: 144.4 (theoretical: 144.6); elemental analysis in percent by weight:

|   | Found | Calculated for $C_7H_{12}O_3$ |
|---|---|---|
| C | 58.3 | 58.3 |
| H | 8.4 | 8.6 |

A solution containing 910 grams (6.32 mols) of tetrahydropyran-2-acetic acid, obtained as described above, 930 grams (20.22 mols) of ethanol, 1.8 grams of concentrated sulfuric acid and 500 ml. of diisopropyl ether was charged to the kettle of a still. The solution was heated at a temperature of 64° C. while removing the water formed during the course of reaction as an azeotropic distillate with the diisopropyl ether. When the formation of water was no longer observed, the residual solution was neutralized by the addition of 2.0 grams of sodium methoxide and subsequently subjected to further distillation. At a temperature of between 62° C. and 64° C., under a pressure of 2 mm. of mercury, 940 grams of ethyl tetrahydropyran-2-acetate were collected as a distillate. The product had the following properties: saponification equivalent: 171.5 (theoretical: 172.1); no unsaturation or hydroxyl content; elemental analysis in percent by weight:

|   | Found | Calculated for $C_9H_{16}O_3$ |
|---|---|---|
| C | 62.7 | 62.8 |
| H | 9.2 | 9.4 |

Example 3

A solution containing 77 grams of a polymeric ester composition formed of recurring units represented by the general formula:

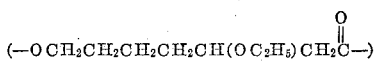

0.76 gram of sodium metal dissolved in 30 ml. of ethanol and 146 grams (1.13 mols) of 2-ethylhexanol was heated for a period of three hours at a temperature maintained in the range of from 185° C. to 195° C. The polymeric ester composition employed in the reaction represented a portion of the product produced by the reaction of 87 grams (2.1 mols) of ketene and 651 grams (4.9 mols) of 2-ethoxytetrahydropyran essentially as described above in Example 1. During the reaction period, ethanol was continually removed from the reaction mixture and upon completion of the reaction, approximately 85 percent of the theoretical amount of ethanol obtainable by the dealcoholation and cyclization of each recurring unit of the polymeric ester composition had been recovered. The crude reaction product was then stripped of 104 grams (0.81 mol) of excess 2-ethylhexanol and distilled at a temperature of between 140° C. and 142° C., under a pressure of 3 mm. of mercury, whereupon 85.0 grams of 2-ethylhexyl tetrahydropyran-2-acetate were collected as a distillate. The product was recovered as a clear water-white liquid at room temperature and had the following properties: no unsaturation; saponification equivalent: 255.4 (theoretical: 256.4); elemental analysis in percent by weight:

|   | Found | Calculated for $C_{15}H_{28}O_3$ |
|---|---|---|
| C | 70.2 | 70.2 |
| H | 11.3 | 11.0 |

Example 4

A solution containing 100 grams of a polymeric ester composition formed of recurring units represented by the general formula:

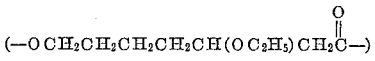

and 1.36 grams of sodium metal contained in 172 grams of n-butanol was heated for a period of two hours at a temperature maintained in the range of from 120° C. to 128° C. The polymeric ester composition employed in the reaction represented a portion of the product produced by the reaction of 87 grams (2.1 mols) of ketene and 651 grams (4.9 mols) of 2-ethoxytetrahydropyran essentially as described above in Example 1. During the reaction period, ethanol was continually removed from the reaction mixture, and upon completion of the reaction, 17.5 grams of ethanol had been recovered. The crude reaction product was then stripped of 142 grams (1.92 mols) of excess n-butanol and distilled at a temperature of between 90° C. and 92° C., under a pressure of 2 mm. of mercury, whereupon 58.0 grams of butyl tetrahydropyran-2-acetate were collected as a distillate. The product was recovered as a clear liquid at room temperature and had the following properties: index of refraction ($n_D^{20}$): 1.4438; saponification equivalent: 202.7 (theoretical: 200.3); elemental analysis in percent by weight:

|   | Found | Calculated for $C_{11}H_{20}O_3$ |
|---|---|---|
| C | 66.0 | 66.0 |
| H | 10.4 | 10.6 |

*Example 5*

To 1297 grams (9 mols) of 2-ethoxy-4-methyltetrahydropyran, cooled to a temperature of −10° C., there were added 40 cc. of a 32 percent solution of boron trifluoride in diethyl ether. Two hundred and thirty-seven grams (5.6 mols) of ketene were then bubbled into the solution during a period of 2.5 hours, while maintaining the reaction mixture at a temperature between −10° C. and −3° C. Upon the complete addition of ketene, the acidic catalyst was neutralized by the addition of a solution containing 50 grams of sodium acetate in 300 cc. of water, and the resulting solution agitated for a period of one hour. The amount of ketene absorbed during the reaction was found to be 202.5 grams (4.8 mols). The crude reaction product was stripped of diethyl ether and 245 grams (1.7 mols) of unreacted 2-ethoxy-4-methyltetrahydropyran by steam distillation. The residual product was dissolved in one liter of diisopropyl ether and resulting solution extracted with water several times for the complete removal of the inorganic salts present. Upon stripping diisopropyl ether from the extracted solution and subsequently removing certain neutral, non-saponifiable, low-boiling side products by distillation at a temperature of from 60° C. to 107° C., under a 3 mm. of mercury pressure, a polymeric ester composition was recovered in a 669-gram yield as a viscous, light-yellow oil and had the following properties: saponification equivalent: 183.7 (theory: 186.2); average molecular weight (Menzies-Wright): 1370; viscosity at a temperature of 100° C.; 950 centistokes; elemental analysis in percent by weight:

|   | Found | Calculated for $(C_{10}H_{18}O_3)X$ |
|---|---|---|
| C | 64.4 | 64.4 |
| H | 10.2 | 9.8 | indicating a recurring unit structure for the polymeric ester composition represented by the general formula:

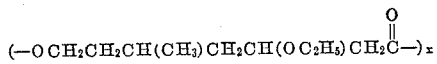

wherein X has an average value of 7.4 as calculated from the determination of average molecular weight.

*Example 6*

A mixture containing 200 grams of a polymeric ester composition formed of recurring units represented by the general formula:

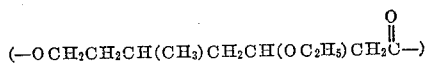

and 48 grams (1.2 mols) of sodium hydroxide contained in 192 ml. of water was heated with reflux at a temperature of 105° C. The polymeric ester composition employed in the reaction had been produced by the reaction of 273 grams (5.6 mols) of ketene and 1297 grams (9.0 mols) of 2-ethoxy-4-methyltetrahydropyran essentially as described above in Example 5. After solution was effected, the heating was continued and temperature of the reaction mixture raised to 135° C. by the gradual removal of water. At a temperature of 135° C., the evolution of ethanol was observed. The reaction mixture was then maintained at a temperature in the range of from 135° C. to 145° C. during which time ethanol was continually removed therefrom. Upon completion of the reaction period, the reaction mixture was diluted with 1 liter of water and acidified by the addition of 32 cc. of concentrated sulfuric acid. 4-methyltetrahydropyran-2-acetic acid thereupon settled out as a light-yellow oil. Upon cooling to room temperature, the oil solidified, and thereafter was recovered by filtration, washed with cold water and dried by exposure to air at room temperaure. The light-yellow solid product was recovered in a 95.0-gram yield and had a neutralization equivalent of 159.5 (theoretical: 159.20). A sample of the 4-methyltetrahydropyran-2-acetic acid recrystallized from a ligroin solution had the following properties: melting point: 76.0° C. to 77.0° C.; saponification equivalent: 158.0 (theoretical: 158.2); elemental analysis in percent by weight:

|   | Found | Calculated for $C_8H_{14}O_3$ |
|---|---|---|
| C | 60.8 | 60.8 |
| H | 9.1 | 8.9 |

*Example 7*

To 858.5 grams (4.25 mols) of 2-ethoxy-6-carbethoxytetrahydropyran, cooled to a temperature of −10° C., there were added 1344 cc. of a 32 percent solution of boron trifluoride in diethyl ether. Eighty-one and one-half grams (1.94 mols) of ketene were then bubbled into the solution during a period of one hour, while maintaining the reaction mixture at a temperature between −10° C. and +10° C. Upon the complete addition of ketene, the acidic catalyst was neutralized by the addition of aqueous sodium acetate. The amount of ketene absorbed during the reaction was found to be 68 grams (1.6 mols). The crude reaction product was diluted with one liter of diisopropyl ether. The organic layer thereby formed was separated and extracted with water to remove the inorganic salts present. The organic product was then stripped of water and diisopropyl ether, after which 510 grams (2.5 mols) of unreacted 2-ethoxy-6-carbethoxytetrahydropyran was removed by distillation at a temperature of 180° C., under 0.5 mm. of mercury pressure. The residual product, a polymeric ester composition, was recovered as a viscous, light-yellow liquid and had the following properties: saponification equivalent: 124.7 (theory: 122); viscosity at a temperature of 100° C.: 1453 centistokes; average molecular weight: 1740; elemental analysis in percent by weight:

|   | Found | Calculated for $(C_{12}H_2O_5)X$ |
|---|---|---|
| C | 59.1 | 59.0 |
| H | 8.4 | 8.3 | indicating a recurring unit structure for the polymeric ester composition represented by the general formula:

wherein X has an average value of 7.1 as calculated from the determination of average molecular weight.

*Example 8*

A mixture containing approximately 250 grams of a polymeric ester composition formed of recurring units represented by the general formula:

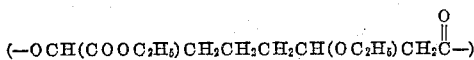

88 grams (4.4 mols) of sodium hydroxide and 792 grams of water was heated at a temperature of 105° C. until a complete solution was effected. During this time, 46 grams (one mol) of ethanol were evolved and removed from the reaction mixture. The polymeric ester composition employed in the reaction represented a portion of the product produced by the reaction of 214 grams (5.1 mols) of ketene and 1535 grams (7.6 mols) of 2-ethoxy-6-carbethoxytetrahydropyran essentially as described above in Example 7. The solution was concentrated by the distillation of water until the temperature of the concentrate reached 135° C., at which point the evolution of ethanol was again observed. Heating was continued at a temperature within the range of from 135° C. to 145° C. for a period of three hours, accompanied by the continuous removal of ethanol from the reaction mixture. The viscous reaction mixture was diluted with 500 ml. of water, cooled to a temperature of 25° C. and acidified by the addition of 117 cc. of concentrated sulfuric acid. The resulting solution was extracted with three 250 ml. portions of 1,2-dioxyethane and the extracts combined. The combined extracts were then stripped of solvent, whereupon 6-carboxytetrahydropyran-2-acetic acid was obtained in a 105-gram yield as a solid residue. After three crystallizations from a combined ethyl ether-ligroin solution, the product was recovered as a white solid having the following properties: melting point: 134.5° C. to 136° C.; neutralization equivalent: 95.5 (theoretical: 94.1); no carbon to carbon unsaturation or free-hydroxyl groups, as indicated by infrared analysis; elemental analysis in percent by weight:

|   | Found | Calculated for C₈H₁₂O₅ |
|---|---|---|
| C | 51.2 | 51.1 |
| H | 6.80 | 6.45 |

*Example 9*

A solution containing 200 grams of a polymeric ester composition formed of recurring units represented by the general formula:

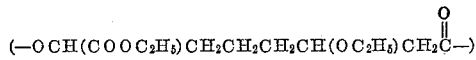

409 (3.18 mols) of 2-ethylhexanol and 2.3 grams of sodium metal dissolved in 50 ml. of ethanol was heated for a period of one hour at a temperature maintained in the range of from 120° C. to 160° C. During this time ethanol was evolved and continuously removed from the reaction mixture. The polymeric ester composition employed in the reaction represented a portion of the product produced by the reaction of 214 grams (7.6 mols) of 2-ethoxy-6-carbethoxytetrahydropyran essentially as described above in Example 7. The reaction temperature was then raised to 210° C. and maintained at this level for an additional period of three hours, accompanied by the continued removal of ethanol from the reaction mixture. The crude reaction product was then stripped of 210 grams (1.54 mols) of excess 2-ethylhexanol and distilled at a temperature of between 196° C. and 202° C., under a pressure of from 0.5 mm. to 1.0 mm. of mercury, whereupon 186 grams of a product consisting essentially of approximately 76 percent by weight of the di(2-ethylhexyl) ester of 6-carboxytetrahydropyran-2-acetic acid and approximately 24 percent by weight of the isomeric di(2-ethylhexyl) ester of 2-hydroxy-6-octenedioc acid were recovered as a distillate. The following properties were obtained for a sample of the product redistilled at a temperature of between 196° C. and 202° C. under a pressure of from 0.5 mm. to 1.0 mm. of mercury: index of refraction ($n_D^{20}$): 1.4584; no free acidity; presence of unsaturated compound (determined using a bromine-sodium bromide reagent and assuming one center of unsaturation per molecule): 23.8 percent by weight; presence of hydroxyl-containing compound (determined using a phthalic anhydride in pyridine reagent and assuming one hydroxyl group per molecule): 26.0 percent by weight; saponification equivalent: 201 (theoretical: 206); elemental analysis in percent by weight:

|   | Found | Calculated for C₂₄H₄₄O₅ |
|---|---|---|
| C | 69.5 | 69.9 |
| H | 10.3 | 10.7 |

The presence of the carbon-carbon unsaturation and the hydroxyl group was confirmed by infra-red analysis.

The invention is capable of modification within the scope of the appended claims.

What is claimed is:

1. A compound selected from the group consisting of the difunctional tetrahydropyran carboxylic acids and tetrahydropyran carboxylic acid esters of the formula

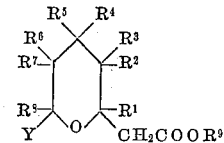

wherein $R^1$ to $R^8$ are selected from the class consisting of hydrogen and lower alkyl, $R^9$ is selected from the class consisting of hydrogen and alkyl of from 1 to 18 carbon atoms, and Y is selected from the class consisting of carbalkoxy of from 2 to 19 carbon atoms and carboxy; $R^9$ being hydrogen when Y is carboxy, and $R^9$ being alkyl when Y is carbalkoxy.

2. 6-carboxytetrahydropyran-2-acetic acid of the formula

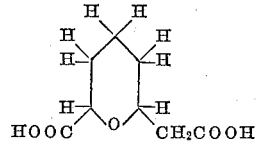

3. The di(2-ethylhexyl) ester of 6-carboxytetrahydropyran-2-acetic acid of the formula

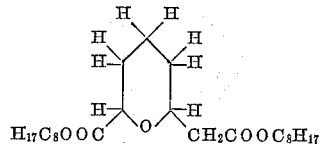

4. A process for the production of tetrahydropyran carboxylic acids of the formula

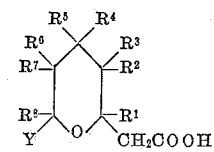

wherein $R^1$ to $R^8$ are selected from the class consisting of hydrogen and lower alkyl, and Y is selected from the class consisting of hydrogen, lower alkyl, and carboxy; which process comprises admixing an alkaline saponification agent with a polymeric ester composition produced by condensing, at a temperature of from about −80° C. to about 100° C. and in the presence of a catalytic amount of an acidic catalyst, ketene and a heterocyclic compound of the formula

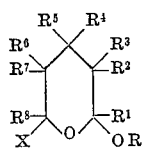

wherein R is alkyl of from 1 to 18 carbon atoms, $R^1$ to $R^8$ are as defined above, and X is selected from the class consisting of hydrogen, lower alkyl, and carbalkoxy of from 2 to 9 carbon atoms; heating the mixture at a temperature of from about 125° C. to about 175° C.; and acidifying the resultant mixture.

5. A process for the production of tetrahydropyran carboxylic acid esters of the formula

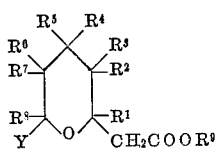

wherein $R^1$ to $R^8$ are selected from the class consisting of hydrogen and lower alkyl, $R^9$ is alkyl of from 1 to 18 carbon atoms, and Y is selected from the class consisting of hydrogen, lower alkyl, and carbalkoxy of from 2 to 19 carbon atoms; which process comprises admixing an alkyl alcohol of the formula $R^9OH$, wherein $R^9$ is as defined above, with a polymeric ester composition produced by condensing, at a temperature of from about —80° C. to about 100° C. and in the presence of a catalytic amount of an acidic catalyst, ketene and a heterocyclic compound of the formula

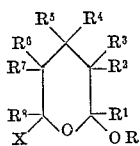

wherein R is alkyl of from 1 to 18 carbon atoms, $R^1$ to $R^8$ are as defined above and X is selected from the class consisting of hydrogen, lower alkyl, and carbalkoxy of from 2 to 19 carbon atoms; said alkyl alcohol being a higher boiling alcohol than the alcohol of the formula ROH, wherein R is as defined above; and heating the mixture at a temperature of from about 120° C. to about 210° C. in the presence of a catalytic amount of an alkaline transesterification catalyst, while removing from the mixture the alcohol of the formula ROH, wherein R is as defined above, that is formed during the process.

6. A process for the production of tetrahydropyran carboxylic acid esters of the formula

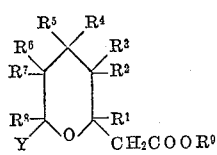

wherein $R^1$ to $R^8$ are selected from the class consisting of hydrogen and lower alkyl, $R^9$ is alkyl of from 1 to 18 carbon atoms, and Y is selected from the class consisting of hydrogen, lower alkyl, and carbalkoxy of from 2 to 19 carbon atoms; which process comprises admixing an alkyl alcohol of the formula $R^9OH$, wherein $R^9$ is as defined above, with a polymeric ester composition produced by condensing, at a temperature of from about —80° C. to about 100° C. and in the presence of a catalytic amount of an acidic catalyst, ketene and a heterocyclic compound of the formula

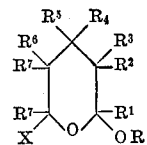

wherein R is alkyl of from 1 to 18 carbon atoms, $R^1$ to $R^8$ are as defined above, and X is selected from the class consisting of hydrogen, lower alkyl, and carbalkoxy of from 2 to 9 carbon atoms; and heating the mixture at a temperature above 150° C. up to about 210° C., in the presence of a catalytic amount of an alkaline transesterification catalyst.

7. A process for the production of tetrahydropyran-2-acetic acid which comprises admixing an alkaline saponification agent with a polymeric ester composition produced by condensing at a temperature of between about —80° C. and about 100° C., in the presence of catalytic amounts of an acidic catalyst, ketene and 2-ethoxytetrahydropyran; heating the mixture at a temperature of between about 125° C. and about 175° C.; acidifying the resultant mixture; and recovering from the acidified mixture the tetrahydropyran-2-acetic acid product thereby formed.

8. A process for the production of 4-methyltetrahydropyran-2-acetic acid which comprises admixing an alkaline saponification agent with a polymeric ester composition produced by condensing, at a temperature of between about —80° C. and about 100° C., in the presence of catalytic amounts of an acidic catalyst, ketene and 2-ethoxy-4-methyltetrahydropyran; heating the mixture at a temperature of between about 125° C. and about 175° C.; acidifying the resultant mixture; and recovering from the acidified mixture the 4-methyltetrahydropyran-2-acetic acid product thereby formed.

9. A process for the production of 6-carboxytetrahydropyran-2-acetic acid which comprises admixing an alkaline saponification agent with a polymeric ester composition produced by condensing, at a temperature of between about —80° C. and about 100° C., in the presence of catalytic amounts of an acidic catalyst, ketene and 2-ethoxy-6-carbethoxytetrahydropyran; heating the mixture at a temperature of between about 125° C. and about 175° C.; acidifying the resultant mixture; and recovering from the acidified mixture the 6-carboxytetrahydropyran-2-acetic acid product thereby formed.

10. A process for the production of 2-ethylhexyl-tetrahydropyran-2-acetate which comprises admixing 2-ethylhexanol with a polymeric ester composition produced by condensing, at a temperature of between about —80° C. and about 100° C., in the presence of catalytic amounts of an acidic catalyst, ketene and 2-ethoxytetrahydropyran; heating the mixture at a temperature of between about 120° C. and about 210° C., in the presence of catalytic amounts of an alkaline transesterification catalyst, while removing from the reaction mixture the ethanol produced during the process; and recovering from the resultant mixture the 2-ethylhexyl tetrahydropyran-2-acetate product thereby formed.

11. A process for the production of butyl tetrahydropyran-2-acetate which comprises admixing butanol with a polymeric ester composition produced by condensing, at a temperature of between about —80° C. and about 100° C., in the presence of catalytic amounts of an acidic catalyst, ketene and 2-ethoxytetrahydropyran; heating the mixture at a temperature of between about 120° C. and about 210° C. in the presence of catalytic amounts of an alkaline transesterification catalyst, while removing from the reaction mixture the ethanol produced during the course of the reaction; and recovering from the resultant mixture the butyl tetrahydropyran-2-acetate product thereby formed.

12. A process for the production of di(2-ethylhexyl)-ester of 6-carboxytetrahydropyran-2-acetic acid which comprises admixing 2-ethylhexanol with a polymeric ester composition produced by condensing, at a temperature of between about −80° C. and about 100° C., in the presence of catalytic amounts of an acidic catalyst, ketene and 2-ethoxy-6-carbethoxytetrahydropyran; heating the mixture at a temperature of between about 120° C. and about 210° C. in the presence of catalytic amounts of an alkaline transesterification catalyst, while removing from the reaction mixture the ethanol produced during the course of the reaction; and recovering from the resultant mixture the di(2-ethylhexyl)ester of 6-carboxytetrahydropyran-2-acetic acid product thereby formed.

References Cited in the file of this patent

UNITED STATES PATENTS 2,798,080   Elam et al _____ July 2, 1957

OTHER REFERENCES

Gzarmodola: Chem. Abst., vol. 31, page 1807 (1937).

UNITED STATES PATENT OFFICE
CERTIFICATE OF CORRECTION

Patent No. 3,032,558  May 1, 1962

Amelio E. Montagna et al.

It is hereby certified that error appears in the above numbered patent requiring correction and that the said Letters Patent should read as corrected below.

Column 2, lines 1 to 4, the formula should appear as shown below instead of as in the patent:

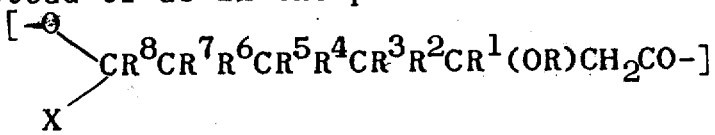

column 6, line 21, for "transesterifiaction" read -- transesterification --; column 12, line 15, for "159.20" read -- 158.20 --; column 13, line 69, for "octenedioc" read -- octenedioie --; column 16, lines 3 to 9, the formula should read as shown below instead of as in the patent:

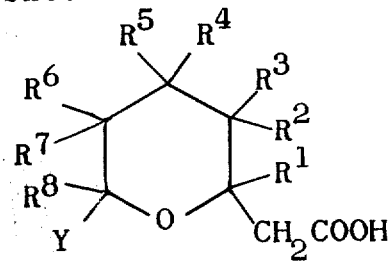

Signed and sealed this 27th day of November 1962.

(SEAL)
Attest: ESTON G. JOHNSON
XBXXXKSXKXXXSWXXHXXX
Attesting Officer

DAVID L. LADD
Commissioner of Patents